United States Patent [19]

Wood et al.

[11] 4,115,014

[45] Sep. 19, 1978

[54] IMPACT PRINTER DRIVESHAFT GEAR AND BEARING ASSEMBLY

[75] Inventors: James Carlos Wood, Houston; Frances Adolph Felcman, Richmond, both of Tex.

[73] Assignee: Texas Instruments Incorporated, Dallas, Tex.

[21] Appl. No.: 793,570

[22] Filed: May 4, 1977

[51] Int. Cl.² ............................................. B41J 11/30
[52] U.S. Cl. ................................. 400/611; 400/616.2
[58] Field of Search ..................... 197/133 R, 133 P; 226/74–76; 308/DIG. 8

[56] References Cited

U.S. PATENT DOCUMENTS

| 3,570,736 | 3/1971 | Skiba | 197/133 R UX |
| 3,656,602 | 4/1972 | Konkel et al. | 197/133 P |

FOREIGN PATENT DOCUMENTS

| 2,233,095 | 1/1974 | Fed. Rep. of Germany | 197/133 R |
| 2,359,062 | 5/1974 | Fed. Rep. of Germany | 308/DIG. 8 |
| 1,313,651 | 4/1973 | United Kingdom | 308/DIG. 8 |
| 1,317,067 | 5/1973 | United Kingdom | 308/DIG. 8 |

OTHER PUBLICATIONS

The Condensed Chemical Dictionary, A. & E. Rose, Reinhold Publishing Corporation, 1961, pp. 495 and 910.

*Primary Examiner*—Paul T. Sewell
*Attorney, Agent, or Firm*—James T. Comfort; Rene' E. Grossman; Thomas G. Devine

[57] ABSTRACT

A driveshaft having a square cross section for driving the paper feed tractors of an impact printer fits, at each end, into the square sockets of a bushing assembly and a gear and hub assembly, respectively. The bushing assembly has an outer circular bearing surface at one end and a raised shoulder at the other end, the bearing surface rotatably mounted within a journal bearing of a first bracket assembly that is mounted on one sidewall of the frame of an impact printer. The hub of the gear and hub assembly is rotatably mounted within a journal bearing of a second bracket assembly which is mounted on the other sidewall of the frame. The first bracket assembly is mounted on the outside surface of the sidewall and the other bracket assembly is mounted on the inside surface of the other sidewall.

9 Claims, 2 Drawing Figures

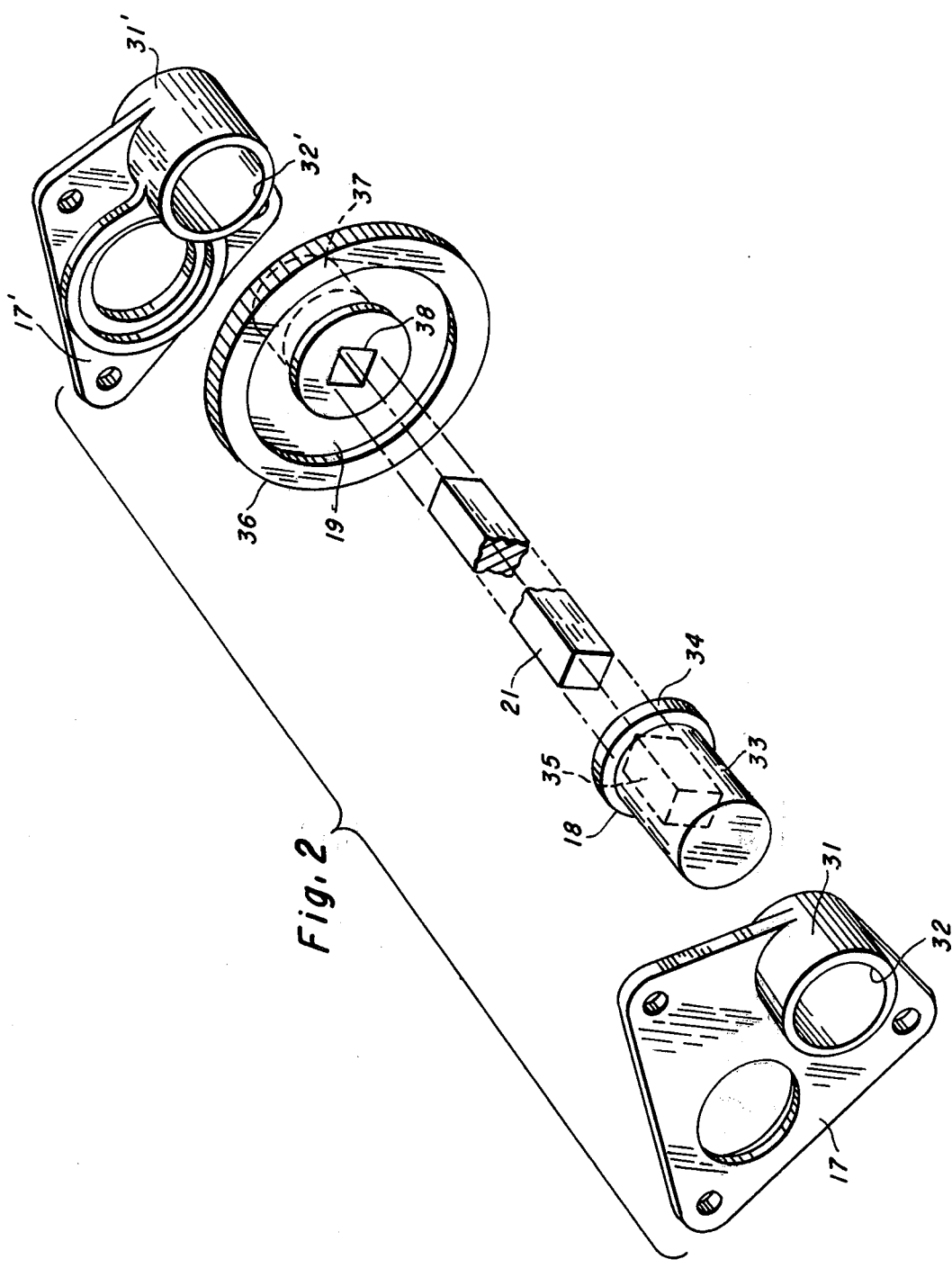

IMPACT PRINTER DRIVESHAFT GEAR AND BEARING ASSEMBLY

BACKGROUND OF THE INVENTION

1. Field of the Invention

This invention pertains to the rotational bearing and gearing of a driveshaft for an impact printer. More specifically, it pertains to the rotational bearing and gearing of a square cross section driveshaft for driving the paper feed tractors of an impact printer.

2. Description of the Prior Art

In the past, typical impact printers of the type utilizing wire matrix printheads, incorporate a square cross section driveshaft for engaging paper feed tractors for automatic paper feeding. These prior art printers have typically incorporated square drive shafts with each end turned down into a circular shape for easy rotation within a bearing in the sidewalls of the frame of the printer assembly. It has also been common practice to form a groove in the turned down, circular cross section ends for a retaining ring.

Forming a circular cross section at the end of the square shaft is a relatively expensive procedure and forming grooves for retaining rings adds still more expense. The additional bearings also add expense. In this preferred embodiment, the use of a fiberglass reinforced polycarbonate material for forming a bushing assembly, a gear and hub assembly, and a pair of bracket assemblies dramatically reduces the cost of manufacture and the cost of assembly. The bracket assemblies are identical, and the bushing assembly and hub and gear assembly each have square sockets for receiving the square ends of the drive shaft. This apparatus precludes the requirement for turning down the ends of the shaft and/or providing grooves and retaining rings.

BRIEF SUMMARY OF THE INVENTION

A primary object of this invention is to provide bearing support and gearing for a square cross section driveshaft used for activating paper feed tractors of an impact printer.

Another object is to provide a paper feed tractor driveshaft that is square in cross section for its entire length.

Still another object is to provide a paper feed tractor driveshaft for an impact printer that does not require being turned down into a circular cross section at each end.

Still another object is to provide a paper feed tractor driveshaft, square in cross section, that does not require any grooves or retaining rings.

A further object is to provide a paper feed tractor driveshaft that is square in cross section and that is simple to assemble and to disassemble.

These and other objects will be made evident in the detailed description that follows.

BRIEF DESCRIPTION OF THE DRAWINGS

FIG. 2 is an exploded view of the square section driveshaft, gear and bearing assembly.

DETAILED DESCRIPTION OF THE INVENTION

Figure 1:
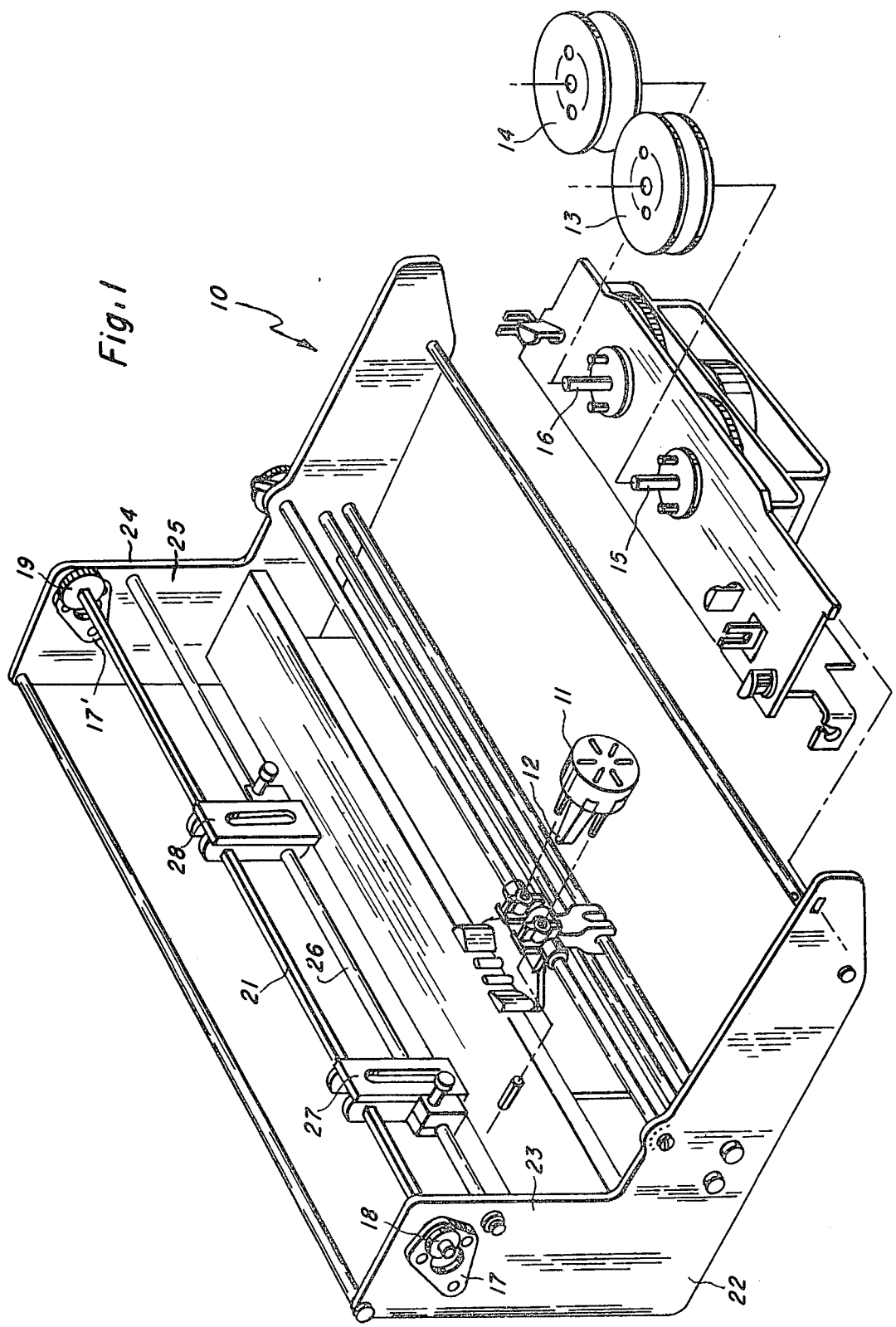
FIG. 1 is a partially exploded view of the frame and inner section of the impact printer of this invention.

FIG. 1 shows the inner framework assembly 10 of the wire matrix impact printer of the preferred embodiment of this invention. The preferred printer is the Model 810 from Texas Instruments Incorporated, Dallas, Texas. Details of the operation, construction and circuitry of the Model 810 printer are available in Texas Instruments Incorporated publications "Operating Instructions for Model 810 Printer" — No. 994,353-9701 and "Model 810 Printer Maintenance Manual" — No. 994,386-9701. Wire matrix printhead 11 having an impact end 12 is shown. Also, print ribbon reels 13 and 14 are shown as they are mounted on spindles 15 and 16. The ribbon itself is not shown.

Sidewall 22 has bracket assembly 17 mounted to its outer face 23. Sidewall 24 has a second mounting bracket 17[1] attached to its inner face 25. Driveshaft 21 is shown passing through paper feed tractors 27 and 28 and into hub assembly 18 which fits into bracket assembly 17 and into gear and hub assembly 19 which fits into bracket assembly 17[1].

In FIG. 2, bushing assembly 18 is shown with socket 35 formed therein, bearing surface 33 and shoulder 34. Driveshaft 21 is shown in an exploded view as it fits into socket 35. Bracket 17 is shown with hub 31 and journal bearing 32 into which bearing surface 33 fits and rotates when driveshaft 21 is activated. The gear and hub assembly 19 is shown with gear 36 and hub 37. The socket 38 receives driveshaft 21 as shown in exploded form. Bracket 17[1] and hub 31[1] with journal bearing 32[1] formed therein into which the hub 37 fits and rotates when driveshaft 21 is rotated.

Referring again to FIG. 1, the bracket 17[1] is shown mounted on inner wall 25 of sidewall 24 and bracket assembly 17 is shown mounted on the outer wall 23 of sidewall 22 to illustrate the preferred embodiment with respect to assembly and disassembly. Brackets 17 and 17[1] are identical parts. It can be seen that bracket 17[1] can first be installed on inner wall 25, with the gear and hub assembly 19 then put in place. The driveshaft 21 can then be inserted into the socket 38 of gear and hub assembly 19, with tractors 27 and 28 in place, and then bracket 17 with bushing assembly 18 in place installed from the outside on outer face 23 of sidewall 22. Not shown is a coil spring which is inserted first into socket 35 providing a resilient force against the end of driveshaft 21, maintaining it firmly in place.

In this preferred embodiment, brackets 17 and 17[1], the bushing assembly 18 and the gear and hub assembly 19 are all made of fiberglass reinforced polycarbonate. Those skilled in the art realize that these parts may well be made of other materials, including metal, without departing from the spirit of this invention. Also, the driveshaft 21 need not be square in cross section, or may have at least one spline with the receiving sockets being keyed to receive the spline, but may be a polygon of various cross sections without departing from the spirit of the invention.

What is claimed is:

1. An impact printer having a frame with a first and second sidewall, and a rotatable drive shaft with a polygon cross section for actuating web feed means mounted thereon, positioned between the first and second sidewalls, the improvement comprising:
   (a) a first bracket assembly, including a hub with a journal bearing formed therethrough, mounted on the first sidewall;
   (b) a second bracket assembly, including a hub with a journal bearing formed therethrough, mounted on the second sidewall;

(c) a bushing assembly having an outer circular bearing surface at one end and a raised shoulder at the other end, and having a socket with a polygon cross section formed from the shoulder end for receiving one end of the drive shaft, such that the one end terminates within the bushing socket near the interior end wall thereof, the outer circular bearing surface engaging the journal bearing of the first bracket assembly and the shoulder abutting one end of the hub of the first bracket; and (d) a gear and hub assembly, having a socket with a polygon cross section formed therein from the gear end, for receiving the other end of the drive shaft such that the other end terminates within the gear and hub socket near the interior end wall thereof, the hub portion of the gear and hub assembly engaging the journal bearing of the second bracket assembly and the gear portion of the gear and hub assembly abutting the hub of the second bracket assembly.

2. The apparatus of claim 1 wherein the cross section of the drive shaft has at least one spline and the cross sections of the bracket assemblies are keyed to accept the spline.

3. The apparatus of claim 1 wherein the cross sections of the drive shaft and the sockets of the first and second bracket assemblies are square.

4. The apparatus of claim 1 wherein the first and second bracket assemblies are identical.

5. The apparatus of claim 3 wherein the first and second bracket assemblies are identical.

6. The apparatus of claim 4 wherein the first and second sidewalls have mounting apertures into which the hubs of the first and second mounting bracket assemblies fit, respectively, the first bracket assembly being mounted on the outer surface of the first sidewall and the second bracket assembly being mounted on the inner surface of the second sidewall.

7. The apparatus of claim 5 wherein the first and second sidewalls have mounting apertures into which the hubs of the first and second mounting bracket assemblies fit, respectively, the first bracket assembly being mounted on the outer surface of the first sidewall and the second bracket assembly being mounted on the inner surface of the second sidewall.

8. The apparatus of claim 6 wherein the first and second bracket assemblies, the bushing assembly and the gear and hub assembly are all formed of fiberglass reinforced polycarbonate.

9. The apparatus of claim 7 wherein the first and second bracket assemblies, the bushing assembly and the gear and hub assembly are all formed of fiberglass reinforced polycarbonate.

* * * * *